US007555750B1

(12) United States Patent
Lilley

(10) Patent No.: US 7,555,750 B1
(45) Date of Patent: Jun. 30, 2009

(54) UPDATE PACKAGE GENERATOR EMPLOYING PARTIAL PREDICTIVE MAPPING TECHNIQUES FOR GENERATING UPDATE PACKAGES FOR MOBILE HANDSETS

(75) Inventor: Patrick C. Lilley, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 678 days.

(21) Appl. No.: 10/646,975

(22) Filed: Aug. 22, 2003

Related U.S. Application Data

(60) Provisional application No. 60/405,253, filed on Aug. 22, 2002, provisional application No. 60/415,620, filed on Oct. 2, 2002, provisional application No. 60/441,867, filed on Jan. 22, 2003, provisional application No. 60/447,977, filed on Feb. 18, 2003.

(51) Int. Cl.
*G06F 9/44* (2006.01)
(52) U.S. Cl. ...................................... 717/168; 717/169
(58) Field of Classification Search .......... 717/168–173
See application file for complete search history.

(56) References Cited

U.S. PATENT DOCUMENTS

| 5,084,816 | A | 1/1992 | Boese et al. |
| 5,261,055 | A | 11/1993 | Moran et al. ................. 395/275 |
| 5,442,771 | A | 8/1995 | Filepp et al. ................. 395/650 |
| 5,479,637 | A | 12/1995 | Lisimaque et al. .......... 395/430 |
| 5,579,522 | A | 11/1996 | Christeson et al. .......... 395/652 |
| 5,596,738 | A | 1/1997 | Pope ........................... 395/430 |
| 5,598,534 | A | 1/1997 | Haas ...................... 395/200.09 |
| 5,608,910 | A | 3/1997 | Shimakura ................. 395/670 |
| 5,623,604 | A | 4/1997 | Russell et al. ............. 395/200.1 |
| 5,666,293 | A | 9/1997 | Metz et al. ............... 395/200.5 |
| 5,752,039 | A | 5/1998 | Tanimura ..................... 395/712 |
| 5,778,440 | A | 7/1998 | Yiu et al. ..................... 711/154 |
| 5,790,974 | A | 8/1998 | Tognazzini .................. 701/204 |
| 5,878,256 | A | 3/1999 | Bealkowski et al. ......... 395/652 |
| 5,960,445 | A | 9/1999 | Tamori et al. ............... 707/203 |
| 5,968,182 | A | 10/1999 | Chen et al. |
| 6,009,497 | A | 12/1999 | Wells et al. ................. 711/103 |
| 6,018,747 | A | 1/2000 | Burns et al. |
| 6,038,636 | A | 3/2000 | Brown, III et al. .......... 711/103 |

(Continued)

FOREIGN PATENT DOCUMENTS

CA    2339923    3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Lewis A Bullock, Jr.
*Assistant Examiner*—Jue S Wang

(57) ABSTRACT

A mobile handset in a mobile services network, with access to a plurality of services including a firmware/software update service, is capable of updating its firmware/software using an appropriate update package that is retrieved from an update package repository via a management server. A generator with partial predictive mapping (PPM) preprocessor is used to create an update package and associated information, such as shift region list information, by comparing two different versions of the firmware/software of the mobile handset.

19 Claims, 3 Drawing Sheets

U.S. PATENT DOCUMENTS

| | | | |
|---|---|---|---|
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,138,249 A | 10/2000 | Nolet | |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,209,127 B1 | 3/2001 | Mori et al. | |
| 6,279,153 B1 | 8/2001 | Bi et al. | 717/11 |
| 6,301,710 B1 | 10/2001 | Fujiwara | |
| 6,311,322 B1 | 10/2001 | Ikeda et al. | 717/1 |
| 6,343,379 B1 | 1/2002 | Ozawa et al. | |
| 6,381,740 B1 | 4/2002 | Miller et al. | |
| 6,408,434 B1 | 6/2002 | Fujiwara | |
| 6,438,585 B2 | 8/2002 | Mousseau et al. | 709/206 |
| 6,526,574 B1 | 2/2003 | Jones | |
| 6,615,038 B1 | 9/2003 | Moles et al. | |
| 6,615,404 B1 | 9/2003 | Garfunkel et al. | |
| 6,668,336 B2 | 12/2003 | Lasser | |
| 6,725,056 B1 | 4/2004 | Moles et al. | |
| 6,725,392 B1 | 4/2004 | Frey et al. | |
| 6,832,373 B2 * | 12/2004 | O'Neill | 717/171 |
| 6,836,657 B2 | 12/2004 | Ji et al. | |
| 6,915,452 B2 * | 7/2005 | Froehlich et al. | 717/168 |
| 6,925,467 B2 | 8/2005 | Gu et al. | |
| 6,928,108 B2 | 8/2005 | Nelson et al. | |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0072359 A1 | 6/2002 | Moles et al. | |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0023964 A1 | 1/2003 | Rajaram et al. | |
| 2003/0027563 A1 | 2/2003 | Herle et al. | |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0074658 A1 | 4/2003 | Kim | |
| 2003/0084435 A1 | 5/2003 | Messer et al. | |
| 2003/0121032 A1 | 6/2003 | Cho et al. | |
| 2003/0162533 A1 | 8/2003 | Moles et al. | |
| 2003/0163508 A1 * | 8/2003 | Goodman | 717/168 |
| 2003/0186689 A1 | 10/2003 | Herle et al. | |
| 2004/0015952 A1 | 1/2004 | Lajoie et al. | |
| 2004/0031031 A1 | 2/2004 | Rudelic | |
| 2004/0034853 A1 | 2/2004 | Gibbons et al. | |
| 2004/0054995 A1 | 3/2004 | Lee | |
| 2004/0111723 A1 | 6/2004 | Moles et al. | |
| 2004/0117785 A1 | 6/2004 | Kincaid | |
| 2004/0133887 A1 | 7/2004 | Herle et al. | |
| 2004/0152455 A1 | 8/2004 | Herle | |
| 2004/0261072 A1 | 12/2004 | Herle | |
| 2004/0261073 A1 | 12/2004 | Herle et al. | |
| 2005/0060699 A1 | 3/2005 | Kim et al. | |
| 2005/0097544 A1 | 5/2005 | Kim | |
| 2005/0144609 A1 | 6/2005 | Rothman et al. | |
| 2005/0144612 A1 | 6/2005 | Wang et al. | |
| 2005/0160195 A1 | 7/2005 | Bruner et al. | |
| 2005/0216902 A1 | 9/2005 | Schafer | |
| 2005/0216903 A1 | 9/2005 | Schafer | |

FOREIGN PATENT DOCUMENTS

| | | |
|---|---|---|
| JP | 8202626 | 8/1996 |
| KR | 2001-0100328 | 11/2001 |
| KR | 2002-0034228 | 5/2002 |

OTHER PUBLICATIONS

"Client Server computing in mobile environments", J. Jing et al, ACM Computing Surveys, vol. 31, Issue 2, pp. 117-159, ACM Press, 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

Computer Dictionary Microsoft Press Third Edition, pp. 88, 190, 1997.

* cited by examiner

UPDATE PACKAGE GENERATOR EMPLOYING PARTIAL PREDICTIVE MAPPING TECHNIQUES FOR GENERATING UPDATE PACKAGES FOR MOBILE HANDSETS

CROSS-REFERENCE TO RELATED APPLICATIONS/INCORPORATION BY REFERENCE

This patent application makes reference to, claims priority to and claims benefit from U.S. Provisional Patent Application Ser. No. 60/405,253, entitled "Firmware Update Network And Process Employing Preprocessing Techniques," filed on Aug. 22, 2002, U.S. Provisional Patent Application Ser. No. 60/415,620, entitled "System for Generating Efficient And Compact Update Packages," filed on Oct. 2, 2002, U.S. Provisional Patent Application Ser. No. 60/441,867, entitled "Mobile Handset Update Package Generator That Employs Nodes Technique," filed on Jan. 22, 2003, and U.S. Provisional Patent Application Ser. No. 60/447,977, entitled "Update Package Generator Employing Partial Predictive Mapping Techniques For Generating Update Packages For Mobile Handsets," filed on Feb. 18, 2003.

The complete subject matter of each of the above-referenced United States Patent Applications is hereby incorporated herein by reference, in its entirety. In addition, this application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

This application is also related to the following co-pending applications, the complete subject matter of each of which is hereby incorporated herein by reference in its entirety:

| Ser. No. | Docket No. | Title | Filed | Inventors |
|---|---|---|---|---|
| | 14121US02 | Firmware Update Network and Process Employing Preprocessing Techniques | Aug. 21, 2003 | Chen Gustafson |
| | 14122US02 | System for Generating Efficient and Compact Update Packages | Aug. 21, 2003 | Chen Gustafson Barber |
| | 14312US02 | Mobile Handset Update Package Generator That Employs Nodes Technique | Aug. 21, 2003 | Chen |

The Applicant hereby identifies the following patent applications pursuant to 37 C.F.R. §1.78(f)(1):

U.S. patent application Ser. No. 10/631,567 filed Jul. 31, 2003;

U.S. patent application Ser. No. 10/654,412 filed Sep. 3, 2003;

U.S. patent application Ser. No. 10/681,861 filed Oct. 8, 2003;

U.S. patent application Ser. No. 10/689,309 filed Oct. 20, 2003, which issued as U.S. Pat. No. 6,978,453 on Dec. 20, 2005;

U.S. patent application Ser. No. 11/251,046 filed Oct. 14, 2005;

PCT Application No. PCT/US03/33241 filed Oct. 20, 2003; and

U.S. patent application Ser. No. 10/788,768 filed on Feb. 27, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

The present invention relates generally to update of firmware/software components in mobile handsets using an update agent, and, more specifically, to the generation of compact update packages employing optimization techniques.

2. Background of the Art

Electronic devices, such as mobile phones and personal digital assistants (PDAs), often contain firmware and application software that are either provided by the manufacturer of the electronic devices, by telecommunication carriers, or by third parties. These firmware and application software often contain software bugs. New versions of the firmware/software are periodically released to fix the bugs or to introduce new features, or both.

When informing a mobile electronic device of the need to update its firmware/software, problems might arise. For example, problems may arise when attempting to control the size of an update package containing the difference information. Update package generation is prone to an "avalanche" effect, wherein a minor change to code may result in relocation of a large amount of other code or components. The relocation of the code may result in difference information that is very large, thereby prolonging the download process and making it more costly. Other problems may arise, such as the inability to clearly and efficiently specify the steps needed to update firmware/software in the electronic device to a new version.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a mobile services network comprising a mobile electronic device having a non-volatile memory, a random access memory and security services; the network further comprising a management server; an update package repository; and a generator with a partial predictive mapping (PPM) preprocessor for generating update packages for updating an old version of a firmware to a new version of the firmware. The update packages generated by the generator with a partial predictive mapping (PPM) preprocessor may incorporate a shift region list.

The process of generating an update package with the generator with a partial predictive mapping (PPM) preprocessor comprises creating a module map of module locations and sizes in the old image of firmware versus the new image of firmware; creating a shift region list; and generating an update package with the shift region list information.

The shift region list is created by, for example, identifying shift points within each module of the firmware, wherein the shift points define shift regions; creating and modifying a first shift region list to include external shifts; consolidating shift regions across modules if address adjustments remain the same across a module boundary; and creating a second shift region list by consolidating shift regions from the first shift region list.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
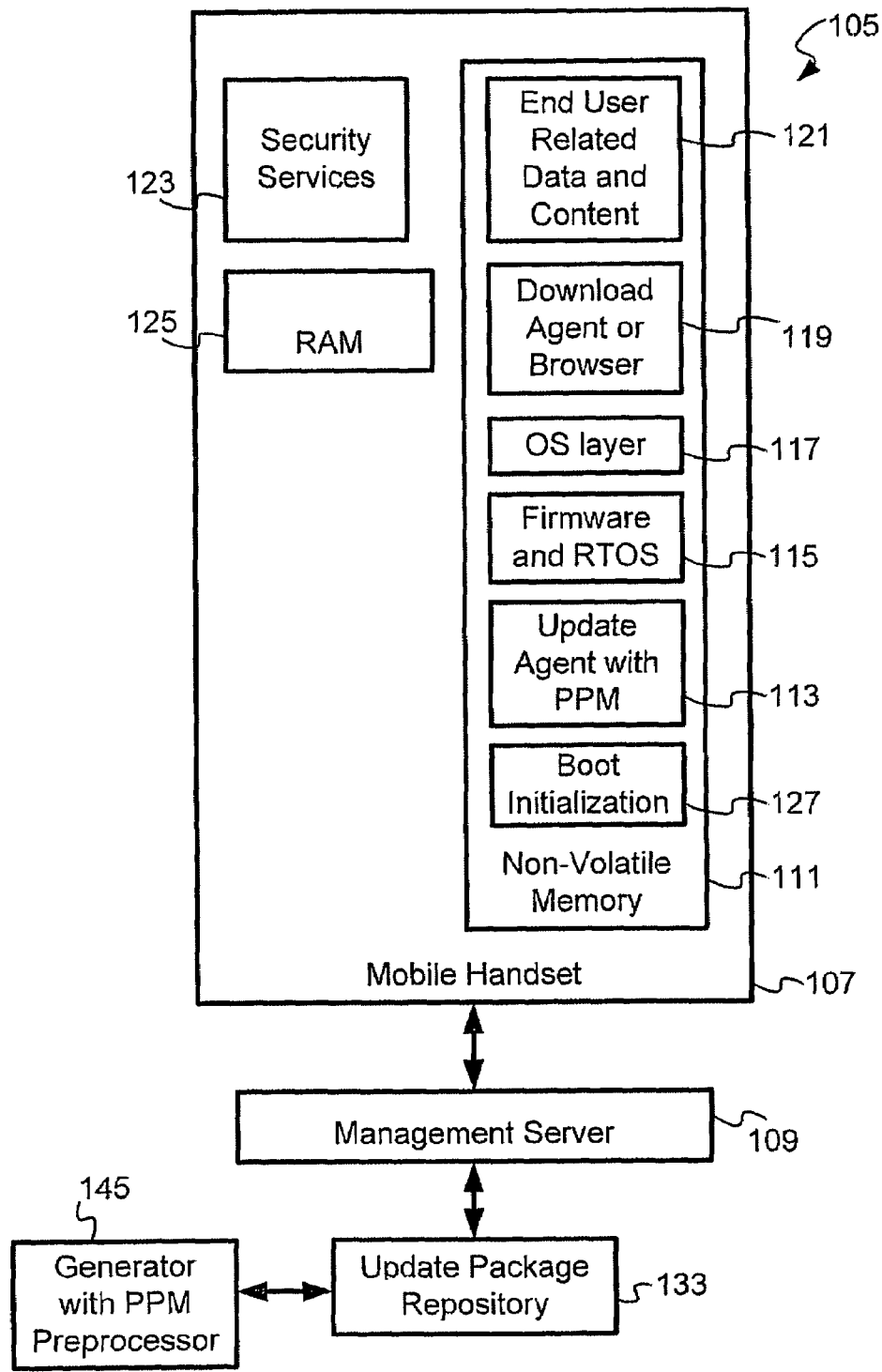
FIG. 1 illustrates a block diagram of an exemplary mobile services network, in accordance with an embodiment of the present invention.

FIG. 1 illustrates a block diagram of an exemplary mobile services network 105, in accordance with an embodiment of the present invention. In the exemplary embodiment of FIG. 1, the mobile services network 105 comprises a mobile handset 107, a management server 109, an update package repository 133, and a generator with a partial predicting mapping (PPM) preprocessor 145. The mobile handset 107 may have access to services that may include a firmware/software update service. The mobile handset 107 may retrieve update packages with an associated shift region list from the management server 109. The update packages may be generated by the generator with a partial predicting mapping preprocessor 145 and populated into the update package repository 133, which is linked to the management server 109. The update package, generated by the generator with a partial predicting mapping preprocessor 145, may incorporate a shift region list with code-shift-related information within the same package. In one embodiment, the shift region list may comprise a list of a two-byte shift region number, a three-byte shift region length, and a four-byte adjustment value, as shown in an example hereinafter. In another embodiment of the present invention, the mobile handset 107 may be a personal digital assistant (PDA) or any mobile electronic device.

In one embodiment, the generator with a partial predicting mapping preprocessor 145 may be coupled to the update package repository 133. The management server 109 may access the update package repository 133 to retrieve the update packages and associated information, such as metadata, shift region list information, etc.

In another embodiment, the generator with a partial predicting mapping preprocessor 145 may be located at a location remote from the update package repository 133. In such an embodiment, the output of the generator with a partial predicting mapping preprocessor 145, namely update packages and associated shift region list information, etc., may be communicated to the update package repository 133 through a storage medium, such as a CD-ROM disk, and loaded into the update package repository 133. Then, the update package may be disseminated to the mobile handset 107 via the management server 109. The generator with a partial predictive mapping preprocessor 145 may generate an update package and associated information, by comparing two different versions of the firmware/software of the mobile handset 107.

The mobile handset 107 may comprise a non-volatile memory 111, a random access memory (RAM) 125, and security services 123. The non-volatile memory 111 of the mobile handset 107 may comprise an update agent 113 with partial predictive mapping support, a firmware and real-time operating system (RTOS) 115, an operating system (OS) layer 117, a download agent or browser 119, an end-user-related data and content 121, and boot initialization 127.

In one embodiment, the mobile handset 107 downloads an update package from the update package repository 133, and then reboots. Upon rebooting, the mobile handset 107 starts up, executes the boot initialization 127, and determines whether the update agent 113 needs to execute the update process. The decision to execute the update process by the update agent 113 may be based on status information such as, for example, the availability of an update package. The status information may be available in the non-volatile memory 111. If it is determined that the update agent 113 needs to execute the update process, the mobile handset 107 may invoke the update agent 113.

In one embodiment, the generator with a partial predictive mapping preprocessor 145 may generate a list of shift regions when it generates an update package. Each entry in the list of shift regions may comprise three values, for example, one value indicating a shift region number, another value indicating shift region length, and the last value indicating an adjustment value used as an offset, as illustrated in an example hereinafter. The shift region list may be incorporated into the update package and loaded into the update package repository 133. When the mobile handset 107 requests an update package from the management server 109, the update package may be delivered to the mobile handset 107 from the update package repository 133 via the management server 109. The update agent 113 in the mobile handset 107 may execute a "preprocessing" step using the shift region list, to prepare the existing or old image of the firmware/software for update. After the preprocessing, the update agent 113 may employ other information from the update package to update the firmware/software.

In one embodiment, the partial predictive mapping technique for preprocessing binary images of firmware/software may utilize "logical" alignment elements within different versions of code such as, for example, an old version and a new version of firmware. The output of the partial predictive mapping preprocessor component of the generator with a partial predictive mapping preprocessor 145 may include shift-related information in terms of location of the region, length of the region, and the associated offset. The shift-related information may be incorporated into the update package to be sent as a single package to the mobile handset 107.

The update package generation by the generator with a partial predictive mapping preprocessor 145 may be used for mobile handsets and other electronic devices, such as devices that contain code or data in non-volatile memory which may require updates to newer or different versions.

Figure 2:
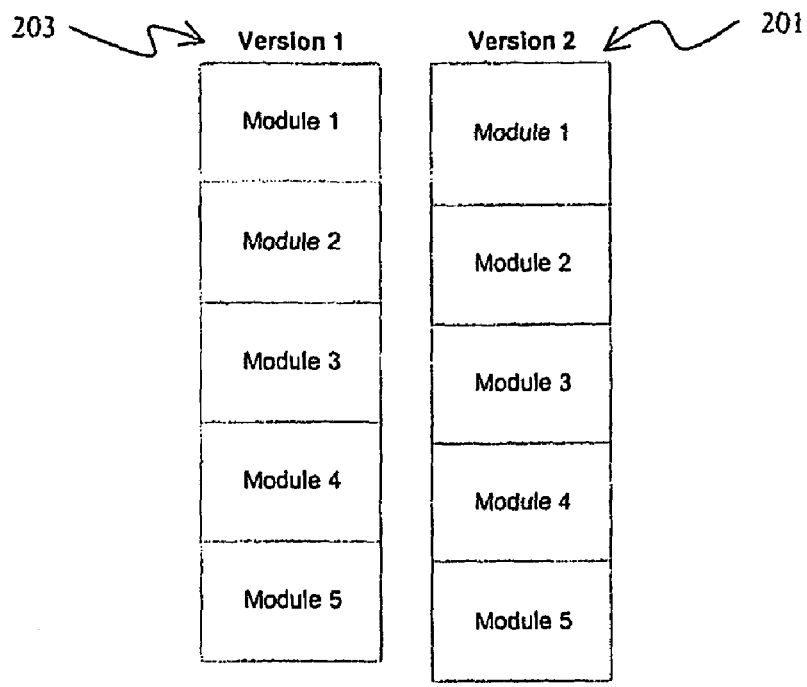
FIG. 2 illustrates an example of a new version of code where the modules have shifted but are in the same order as the old version of code, in accordance with an embodiment of the present invention.

FIG. 2 illustrates an example of a new version 201 of code where the modules have shifted but are in the same order as the old version 203 of code, in accordance with an embodiment of the present invention. Preprocessing techniques may be utilized to attempt aligning of the elements of an old version of a code, such as firmware or software, with elements of the new version of the code. In one embodiment, the process of aligning code may handle shifts in module locations, and predict the shift values of branch instruction parameters (and any similar address-based or offset-based instructions) in the binary firmware image. The preprocessing methods described herein have proven highly efficient in situations as shown in FIG. 2, where the old version 203 and the new version 201 look relatively similar, in that the modules within each version remain in the same order relative to each other, but have shifted in location.

Figure 3:
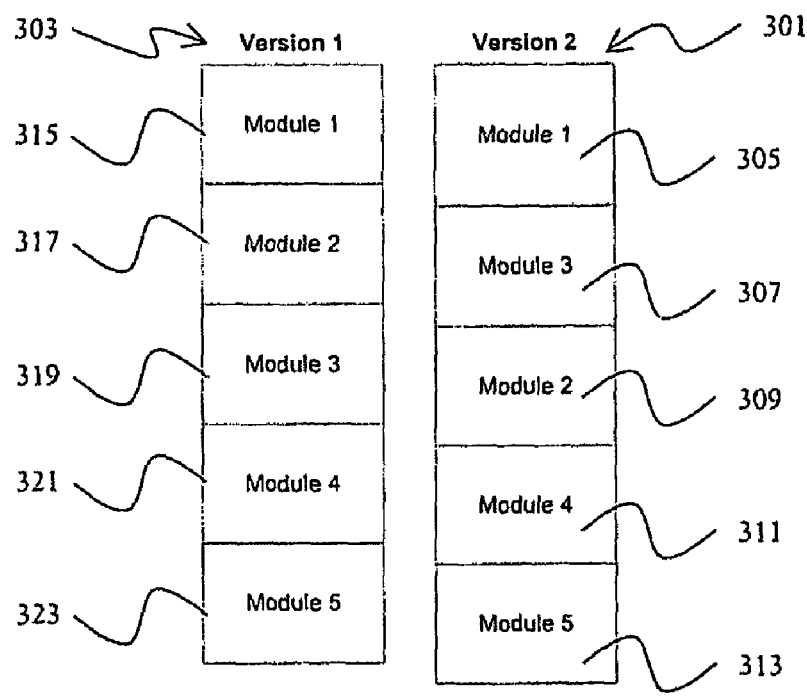
FIG. 3 illustrates an example of a new version of code where the modules are not in the same order as the old version of code, in accordance with an embodiment of the present invention.

FIG. 3 illustrates an example of a new version 301 of code where the modules are not in the same order as the old version 303 of code, in accordance with an embodiment of the present invention. In such a case, partial predictive mapping may be used. Partial predictive mapping identifies shifts in module locations as well as "shift points" within modules, and uses this information to efficiently encode a list of "shift regions." The shift region list may then be used to adjust branch link address parameters within the region, without explicitly mapping each branch link instruction in the old image to its counterpart in the new image.

In a firmware image, there may be thousands of modules. Each module may shift its location and/or change its order relative to other modules, as show in FIG. 3. Additionally, each module may change internally, as shown in FIG. 3 with respect to module 1, where it grew from a smaller size module 1, 315, in the old image 303 to a larger size module 1, 305, in the new image 301. These changes can be described in terms of "shift regions" bounded by "shift points." A "shift region" is a contiguous range of code in which branch link target address/offset parameters change by a constant amount for target addresses that are "internal" (an address in the shift region). Partial predictive mapping may also handle branch link target addresses that are "external" (a different shift region than the one in which the branch link instruction resides).

In one embodiment, as illustrated by the example of FIG. 3, module 4 (321 and 311) and module 5 (323 and 313) did not change order, but were shifted forward as a result of module 1 (315 and 305) growing in size. Therefore, there is a shift point at the beginning of module 4 (321 and 311) denoting the beginning of a shift region that comprises all of module 4 (321 and 311) and module 5 (323 and 313).

In the example illustrated by FIG. 3, the addition to module 1 (315 and 305) may be an insertion of code, data, etc., somewhere in the middle of the old module version, with everything else in the module remaining the same. This insertion causes "internal" branch link address/offset parameters after the addition to shift forward by a constant amount within each shift region. Therefore, partial predictive mapping defines a shift point in version 1 (303) where an insertion is detected, denoting a shift region from that point to the end of module 2 (317).

Figure 4:
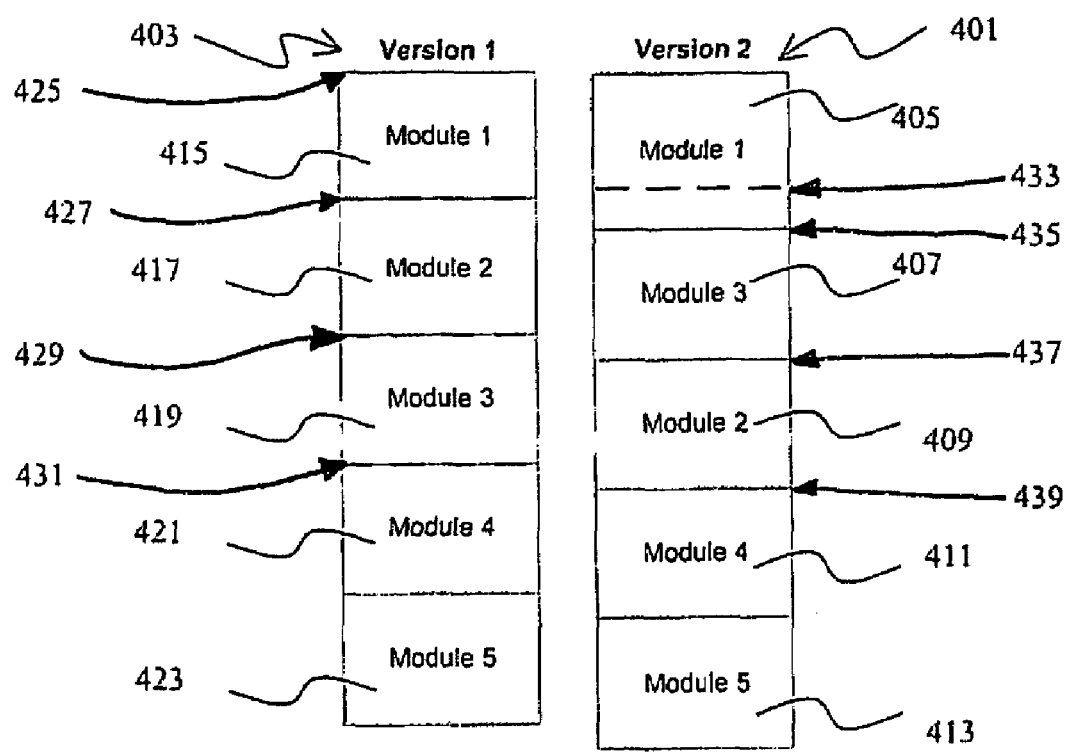
FIG. 4 illustrates an example of inserting shift points to define shift regions as applied to FIG. 3, in accordance with an embodiment of the present invention.

FIG. 4 illustrates the shift points and shift regions discussed hereinabove as applied to the examples illustrated by FIG. 3. A shift point (425) is defined at the beginning of the old image 403, or at the start of module 1 (415). This shift point (425) defines a shift region equal to module 1 (415) in the old image 403. A second shift region equal to module 2 (417) is defined by a shift point (427) at the start of module 2 (417). A third shift region equal to module 3 (419) is defined by a shift point (429) at the start of module 3 (419). A fourth shift region equal to modules 4 and 5 (421 and 423) is defined by a shift point (431) at the start of module 4 (421). As a result of inserting the shift points, there are a total of four shift regions within the new version (401) of firmware. In the example illustrated by FIG. 4, in the old image (403) the defined shift regions are defined by module boundaries, in other embodiments shift regions may not correspond to module boundaries. The mapping of the shift regions between the old image (403) and the new image (401) compares the positions of the defined shift regions in term of the shift points defining their starting points in the old image (403) with their starting points in the new image (402). This will be explained further in an example hereinafter.

A partial predictive mapping shift region list is a list of shift regions as described hereinabove, along with their shift adjustments. A shift region list may be created by a generator analysis module, and used by a preprocessor in a generator with a partial predictive mapping preprocessor to modify branch link address/offset parameters throughout the affected portion of the firmware image. The modifications may adjust branch link address/offset parameters in the old image of the firmware to match the new image of the firmware. The generator with a partial predictive mapping preprocessor may then process the modified old image and the new image to produce difference information comprising core generator instructions. Using this approach, the partial predictive mapping preprocessor may not need to produce accurate adjustments to branch link address parameters in all cases, but improves core generator efficiency in the majority of cases. Hence, partial predictive mapping is designed to produce a high accuracy of branch link address parameter adjustment despite module shifts and/or changes in module order.

In one embodiment, the partial predictive mapping implementation may utilize executable and linking format (ELF) files to determine module location changes. However, shift region lists may also be created by using only the old and new binary images of the firmware, such that partial predictive mapping may change from a tool chain-specific approach to a CPU-specific approach. The preprocessor may determine where modules begin and end in both the old and the new images of firmware, by analyzing the old and new binary images.

To create a shift region list, the partial predictive mapping preprocessor may identify shift points. In one embodiment, the partial predictive mapping preprocessor may identify shift points within each module, and consolidate shift regions across modules if branch link adjustments are the same across a module boundary. This may be done, for example, using two preprocessing operations, one for analysis, and another for preprocessing shift information to be output to the core generator.

The analysis operation may consist of several steps. A first step may create a module map, which may be comprised of module locations and sizes in the old image of firmware and the new image of firmware. The module map may be used by the partial predictive mapping preprocessor in the generator with a partial predictive mapping preprocessor. The next step, step 2, in creating a shift region list may create an initial shift region list for "internal" shifts. In this list, each shift region may correspond to a module in the old image of firmware. The "adjustment" value in this case may be the difference between the start location of the module in the old image and the start location of the same module in the new image of firmware. Step 3 may modify the shift region list for "external" shifts. In this step, the preprocessor may identify the modules that have changed in size from the old image to the new image of firmware. The preprocessor may then adjust the branch link addresses in the old image of firmware by the adjustment values from step 2. Adjusting the branch link addresses makes it possible to identify areas where new code may have been inserted, added, or removed. Each area of the new image that is different from the old image may result in a shift point inside the module being analyzed. These shift points may form the boundaries for shift regions inside that module in the old image of firmware. At this point in the process, the existing shift region list entries for each module that was identified as changing size may be deleted, and the preprocessor may insert the appropriate entries for the newly identified shift regions into the shift region list. Proceeding from the beginning of the shift region list, contiguous shift regions having the same adjustment values may be identified. Such entries may be consolidated into one shift region. The module map may then be discarded. This process produces a region shift list, which may be sent with a standard update package. A shift region list produced in this manner may be utilized by the partial predictive mapping preprocessor of the update agent to modify the old image of firmware to look more like the new image of firmware. An update algorithm may then be applied to the old image to produce the new image.

A shift region list may be encoded in one of several ways. In one embodiment, a shift region list may be encoded utilizing a shift region matrix as illustrated by an example in the following table:

| Shift Region Number (two bytes) | Shift Region Length (three bytes) | Adjustment (four bytes) |
|---|---|---|
| 1 | 10 kB | +0 kB |
| 2 | 10 kB | +12 kB |
| 3 | 10 kB | −8 kB |
| 4 | 20 kB | +2 kB |

Since this is a preprocessor, the shift region length is the length of the shift region in the old image of the firmware. In reference to FIG. 4, let us assume that each module in the old image 403 is 10 kilobytes (kB) in size. Let us also assume that module 1 (415) has increased in size by 2 kB to result in a new module 1 (405) in the new image 401. As a result module 1 (405) in the new image 401 is 12 kB in size. As the matrix above shows, the starting address or the first shift point 425 of module 1, defining the beginning of shift region 1 remains the same, hence, shift region 1 equal to module 1 (415) in the old image 403 needs no adjustment, or an adjustment value of +0 kB. Shift region 2, equivalent to module 2 (417) and defined by shift point 427 in the old image 403, has changed module order with shift region 3, equivalent to module 3 (419) defined by shift point 429 in the old image 403. The shift points 427 and 429 in the old image 403 are now shift points 437 and 435 in the new image 401, respectively. Hence shift point 427 has moved forward from its original position in the old image 403 by 12 kB, which is the size of module 3 (10 kB) plus the increase in size of module 1 (2 kB) illustrated by the area between the point 433 and the shift point 435. In a similar analysis, shift point 429 has moved backward from its original position in the old image 403 by 8 kB, since in the old image 403 shift point 429 was 20 kB below the start shift point 425, whereas in the new image 401 the corresponding shift point 435 defining the starting point of module 3 (407) is directly after module 1 (405), hence 12 kB from the start of the new image 401. Modules 4 and 5 are contiguous, and have the same adjustment factor, in that they both have been adjusted from their original location, or the original location of the shift point 431 to a new shift point location 439, by the same amount, 2 kB, which is the increase in the size of module 1. In this case, module 4 and 5 may be consolidated into one shift region 4 with that adjustment factor, and a length that comprises the total length of modules 4 and 5, which is 20 kB.

In one embodiment, the partial predictive mapping algorithm does not simply adjust branch links within a shift region by the adjustment amount stored in the shift region matrix, since that may be incorrect for "external" branch links referencing regions outside that particular shift region. In the example of the shift region matrix shown above, and FIG. 4, if a branch link instruction in shift region 1 references an address within shift region 4, an adjustment of 0 kB may not be appropriate, since the bytes in shift region 4 have shifted forward by 2 kB. Therefore, the partial predictive mapping preprocessor may distinguish between "internal" branch links that link to addresses within the same shift region, and "external" branch links that branch to addresses within other shift regions. Each branch link may be adjusted according to the adjustment for its referenced ("target") shift region.

Several methods may be used to ensure branch links are adjusted correctly to accommodate any "external" branch links. In one embodiment, the pseudo-code shown below may be used. In this embodiment, it may be assumed that the preprocessor is familiar with CPU-specific op code and parameter format for branch link and other instructions that use absolute or offset addressing parameters.

Set pointer to address zero in old firmware image
    Let BeginPoint = 0
    For each shift region
    Let EndPoint = current shift region endpoint
    Let LocalAdjustment = current shift region adjustment
    Move pointer to next branch link instruction
    Let TargetAddress = address parameter of branch link instruction
    If TargetAddress is between BeginPoint and EndPoint then
        Modify branch link instruction to adjust address parameter
    Else
        Use shift region list to look up target shift region for that TargetAddress
        Get adjustment for the target shift region (also in shift region list)
        Modify branch link instruction to adjust address parameter
    End If
    Let BeginPoint = EndPoint
    Next shift region While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile services network comprising:
    a mobile electronic device;
    a management server;
    an update package repository; and
    a generator for generating an update package used in updating firmware in the mobile electronic device from a first version to a second version, the update package comprising encoded difference information and a shift region list that identifies at least one region of the first version of firmware and an associated offset, wherein the first version is modified to correspond with the shift region list in the update package, the encoded difference information is generated to comprise the differences between the second version and the modified first version, and the shift region list is generated by:
  identifying shift points within each module of the firmware, the shift points defining shift regions;
  creating a first shift region list;
  modifying a first shift region list to include external shifts; and
  creating a second shift region list.

2. The network according to claim 1 wherein the update packages are populated into the update package repository.

3. The network according to claim 1 wherein the management server and the update package repository are communicatively coupled.

4. The network according to claim 1 wherein the generator and the update package repository are communicatively coupled.

5. The network according to claim 1 wherein the generator is located at a location remote from the update package repository.

6. The network according to claim 1 wherein the mobile electronic device comprises:
  a non-volatile memory;
  a random access memory; and
  security services.

7. The network according to claim 6 wherein the non-volatile memory comprises:
  an update agent;
  a firmware and real-time operating system;
  a download agent; and
  a boot initialization.

8. The network according to claim 7 wherein the non-volatile memory further comprises an operating system layer.

9. The network according to claim 7 wherein the non-volatile memory further comprises an end-user-related data and content unit.

10. The network according to claim 7 wherein the mobile electronic device performs the following:
  downloading an update package from the update package repository;
  rebooting;
  executing the boot initialization;
  determining whether an update process is needed; and
  invoking the update agent.

11. The network according to claim 10 wherein the mobile electronic device determines the need for an update process based on status information.

12. The network according to claim 10 wherein the mobile electronic device invokes the update agent to execute the update process if it is determined an update process is needed.

13. A method for generating an update package using a first version and a second version of firmware in a mobile services network, the method comprising:
  creating a module map identifying one or more modules in the first version of firmware and corresponding modules in the second version of firmware, wherein each module comprises a region of firmware;
  creating a shift region list that identifies at least one region of the first version of firmware and an associated address adjustment, wherein creating the shift region list comprises:
    identifying shift points within each module of the firmware, wherein the shift points define shift regions;
    creating a first shift region list;
    modifying a first shift region list to include external shifts; and
    creating a second shift region list;
  generating encoded difference information that comprises differences between the first version that is modified to correspond to the shift region list and the second version; and
  generating an update package using the encoded difference information and the shift region list.

14. The method according to claim 13 wherein the module map comprises module locations and sizes in the first version of firmware and the second version of firmware.

15. The method according to claim 13 wherein the method further comprises consolidating adjacent shift regions having identical address adjustments.

16. The method according to claim 13 wherein the first shift region list comprises:
  shift regions corresponding to modules in the first version of firmware;
  sizes of the shift regions; and
  address adjustment values corresponding to the difference between a start location of a module in the first version of firmware and the start location of the same module in the second version of firmware.

17. The method according to claim 16 wherein modifying the first shift region list comprises:
  finding modules that changed size from the first version of firmware to the second version of firmware;
  adjusting address-based instructions in the first version of firmware using the address adjustment value of the changed modules;
  identifying areas where new content was inserted into a module;
  defining the identified areas of new content as new shift regions;
  deleting the changed modules from the first shift list; and
  inserting the defined shift regions into the first shift list.

18. The method according to claim 15 wherein adjacent shift regions are consolidated if modules remain unchanged in the from the second version.

19. The method according to claim 15 wherein the second shift region list is the result of consolidating shift regions in the modified first shift region list.

* * * * *